US00RE41050E

(19) United States
(12) Reissued Patent
Panasewicz et al.

(10) Patent Number: US RE41,050 E
(45) Date of Reissued Patent: Dec. 22, 2009

(54) IMAGE PROJECTION APPARATUS

(75) Inventors: Dale A. Panasewicz, Strongsville, OH (US); Dennis Futo, Strongsville, OH (US); Marc Louis Vitantonio, Sr., South Russell, OH (US); John R. Nottingham, Bratenahl, OH (US); John W. Spirk, Gates Mills, OH (US)

(73) Assignee: Emerald Innovations, LLC, Butler, PA (US)

(21) Appl. No.: 11/519,240

(22) Filed: Sep. 11, 2006

Related U.S. Patent Documents

Reissue of:
(64) Patent No.: 6,695,452
Issued: Feb. 24, 2004
Appl. No.: 10/008,112
Filed: Oct. 22, 2001

U.S. Applications:
(60) Provisional application No. 60/243,309, filed on Oct. 27, 2000.

(51) Int. Cl.
*G03B 21/14* (2006.01)

(52) U.S. Cl. ..... 353/119
(58) Field of Classification Search ..... 353/39, 353/42, 43, 100, 110, 119
See application file for complete search history.

(56) References Cited

U.S. PATENT DOCUMENTS

| | | | |
|---|---|---|---|
| 1,747,556 | A | 2/1930 | Price |
| 1,885,841 | A | 11/1932 | Krupnik |
| 2,170,368 | A | 8/1939 | Gentilini |
| 2,445,651 | A | 7/1948 | Weavie |
| 2,630,642 | A | 3/1953 | Mast et al. |
| 2,699,621 | A | 1/1955 | Levinson |

(Continued)

OTHER PUBLICATIONS

Office action from U.S. Appl. No. 10/008,112, mailed May 22, 2003.
Notice of Allowance from U.S. Appl. No. 10/008,112, mailed Sep. 23, 2003.
Office action from U.S. Appl. No. 10/605,210, mailed Jun. 29, 2004.
Notice of Allowance from U.S. Appl. No. 10/605,210, mailed Jun. 6, 2005.
Notice of Allowance from U.S. Appl. No. 10/605,210, mailed Mar. 10, 2006.
Notice of Allowance from U.S. Appl. No. 10/605,210, mailed Jun. 22, 2006.
Office action from U.S. Appl. No. 11/561,268, mailed Jun. 1, 2007.
Office action from U.S. Appl. No. 11/360,705, mailed Aug. 22, 2006.
Notice of Abandonment from U.S. Appl. No. 11/360,705, mailed Dec. 4, 2006.
Office action from related U.S. Appl. No. 11/561,268, mailed Jun. 1, 2007.

*Primary Examiner*—William C. Dowling
(74) *Attorney, Agent, or Firm*—John D. Gugliotta, PE, Esq.

(57) ABSTRACT

A projector having a polymeric housing containing an electrical light source, an image medium support assembly aligned in the light path of the light source, and a lens through which light emanating from the light source exits the housing after passing through an image medium disposed in the image support assembly. The projector is preferably adjustably mounted on a support member comprising a tubular section containing a transformer. The projector can be made with an electric motor inside the housing that causes a wheel comprising multiple fixed images to continuously or intermittently rotate the same or different images sequentially through the light path of the projector. A projector assembly is also disclosed in which a projector is mounted in a frame assembly in combination with a rotating mirror ball that simultaneously redirects the projected image in many different directions and continuously changes the image being projected onto a particular spot on surrounding viewing surfaces.

11 Claims, 6 Drawing Sheets

U.S. PATENT DOCUMENTS

| | | | |
|---|---|---|---|
| 2,811,892 | A | 11/1957 | Holloway |
| 3,072,015 | A | 1/1963 | Thannhauser |
| D201,528 | S | 6/1965 | Nemeth |
| D204,837 | S | 5/1966 | Olson |
| 3,366,006 | A | 1/1968 | Saila |
| D211,803 | S | 7/1968 | Genin |
| 3,409,353 | A | 11/1968 | Zillmer |
| 3,431,409 | A | 3/1969 | Richter, III et al. |
| 3,756,710 | A | 9/1973 | Taylor |
| 3,767,299 | A | 10/1973 | Fisher |
| D231,489 | S | 4/1974 | Uitz et al. |
| 3,897,144 | A | 7/1975 | Hicks |
| 4,097,136 | A | 6/1978 | Astarloa |
| 4,171,882 | A | 10/1979 | Johnson, III et al. |
| 4,214,296 | A | 7/1980 | Magett |
| 4,250,537 | A | 2/1981 | Roegner et al. |
| 4,307,528 | A | 12/1981 | Dewees et al. |
| 4,557,055 | A | 12/1985 | Arai |
| 4,756,614 | A | 7/1988 | Kato et al. |
| 4,764,850 | A | 8/1988 | Albanese |
| 4,779,176 | A | 10/1988 | Bornhorst |
| 4,902,117 | A | 2/1990 | Papp |
| 4,972,305 | A | 11/1990 | Blackburn |
| 5,170,196 | A | 12/1992 | Itoh |
| 5,191,368 | A | 3/1993 | Kalua et al. |
| 5,233,375 | A | 8/1993 | Williams et al. |
| 5,272,604 | A | 12/1993 | Lin |
| 5,311,226 | A | 5/1994 | Karasawa |
| 5,311,348 | A | 5/1994 | Yamakawa |
| 5,321,449 | A | 6/1994 | Coccoli et al. |
| 5,357,289 | A | 10/1994 | Konno et al. |
| 5,367,349 | A | 11/1994 | Zeiler |
| 5,374,969 | A | 12/1994 | Kyhl et al. |
| 5,459,539 | A | 10/1995 | Yamamoto |
| 5,463,433 | A | 10/1995 | Koo |
| 5,517,264 | A | 5/1996 | Sutton |
| 5,580,143 | A | 12/1996 | Behr |
| 5,613,799 | A | 3/1997 | Guide |
| 5,663,762 | A | 9/1997 | Nishiyama |
| 5,769,684 | A | 6/1998 | Lou |
| 5,803,564 | A | 9/1998 | Bruinsma et al. |
| 5,951,137 | A | 9/1999 | Bortz |
| 5,978,051 | A | 11/1999 | Gohman et al. |
| 5,980,045 | A | 11/1999 | Fujibayashi |
| 6,000,813 | A | 12/1999 | Krietzman |
| 6,012,815 | A | 1/2000 | Bruinsma et al. |
| 6,053,615 | A | 4/2000 | Peterson et al. |
| 6,145,228 | A | 11/2000 | LaChance |
| 6,227,672 | B1 | 5/2001 | Bortz |
| 6,283,600 | B1 | 9/2001 | Levasseur |
| 6,481,853 | B2 | 11/2002 | Meng-Suen |
| 6,505,940 | B1 | 1/2003 | Gotham et al. |
| 6,508,554 | B2 | 1/2003 | Hatakeyama et al. |
| 6,695,452 | B2 | 2/2004 | Panasewicz et al. |
| 6,702,445 | B1 | 3/2004 | Meng-Suen |
| 6,793,355 | B1 | 9/2004 | Leung |
| 7,182,472 | B2 | 2/2007 | Vitantonio et al. |
| 2002/0101571 | A1 | 8/2002 | Panasewicz et al. |
| 2004/0119951 | A1 | 6/2004 | Vitantonio et al. |
| 2004/0125348 | A1 | 7/2004 | Carkner |
| 2006/0256291 | A1 | 11/2006 | Vitantonio et al. |
| 2007/0076177 | A1 | 4/2007 | Vitantonio et al. |

14
16
18
20
22
24
26
28
30
32
34
38
40
42
44
46
48
50
52
56
58

IMAGE PROJECTION APPARATUS

Matter enclosed in heavy brackets [ ] appears in the original patent but forms no part of this reissue specification; matter printed in italics indicates the additions made by reissue.

CLAIM OF PRIORITY

This application *is a reissue of U.S. Pat. No. 6,695,452 issued Feb. 14, 2004, which* claims the benefit of U.S. provisional patent application No. [60/243,309 filed on Oct. 27, 2000] *60/242,309 filed on Oct. 20, 2000. The present application claims benefit to that provisional's filing date while it incorporates all the subject matter of both '452 and '309 as if it is fully rewritten herein.*

BACKGROUND OF THE INVENTION

1. Field of the Invention

This invention relates to devices used to project images embodied on transparent polymeric film onto one or more viewing surfaces by shining a light through the image embodied on the film. More particularly, the invention relates to projectors used to project thematic images singly, in either a static or serial display, onto a viewing surface or to project multiple views of an image simultaneously onto a plurality of viewing surfaces.

2. Description of Related Art

The projection of images using light is a well known and popular way to decorate or entertain, especially during the holidays, seasonal events or special occasions. One can display images associated with the occasion (e.g. a ghost for Halloween), and a projected image displayed under low light conditions can make a lasting impression on an observer. A relatively small image can be enlarged to many times its original size and displayed upon a surface such as a wall, garage door, sheet, screen or the like.

Drawbacks to the practice of projecting images using light include the high cost of conventional projectors, many of which cannot be used outdoors in inclement weather, and the fact that such projectors typically require some intervention by the user in order to change the image being projected. Projectors are therefore needed that are economical to manufacture and use, that can be used outdoors without risk of injury or damage, and that can display images singly, serially, or simultaneously on multiple surfaces without user intervention.

SUMMARY OF THE INVENTION

According to one embodiment of the invention, a low cost projector is provided that comprises a polymeric housing containing a directional electric light source, an image medium support assembly aligned in the light path of the light source, and a lens through which light emanating from the light source exits the housing after passing through an image medium disposed in the image medium support assembly. For outdoor use, the projector is preferably attachable to a support member such as a mounting stake by a mechanism permitting the angle between the projector and the support member to be selectively adjusted, thereby simultaneously adjusting the angle at which the image is projected relative to an underlying support surface. According to a particularly preferred embodiment of the invention, the support member preferably further comprises a tubular section containing a transformer that converts standard house current to a lower voltage power source for the projector.

According to another embodiment of the invention, a projector is disclosed that is substantially as described above but modified to serially advance different images into the light path without user intervention. A preferred modification for achieving this function this the provision of a small electric motor inside the housing with a rotating shaft that causes a wheel comprising multiple fixed images to rotate the same or different images sequentially through the light path of the projector. This rotation can be accomplished continuously or intermittently by the provision of approximate conventional linkage and control mechanisms well known to those of skill in the art.

According to another embodiment of the invention, a projector assembly is disclosed that comprises a low cost projector substantially as described above but modified to simultaneously project a single image in a plurality of directions after the projected light beam exits the projector housing. This embodiment of the invention utilizes a frame assembly that aligns the projector with a rotating mirror ball that simultaneously redirects the projected image in many different directions and continuously changes the image being projected onto a particular spot on surrounding viewing surfaces. This embodiment of the invention is particularly preferred for indoor use where the image can be directed against both walls and ceiling at the same time. One aesthetic effect that can, for example, be produced using the apparatus of the invention is the illusion of falling snow where the projected image is that of snowflakes.

BRIEF DESCRIPTION OF THE DRAWINGS

The apparatus of the invention is further described and explained in relation to the following figures of the drawings wherein.

DESCRIPTION OF THE PREFERRED EMBODIMENTS

Figure 1:
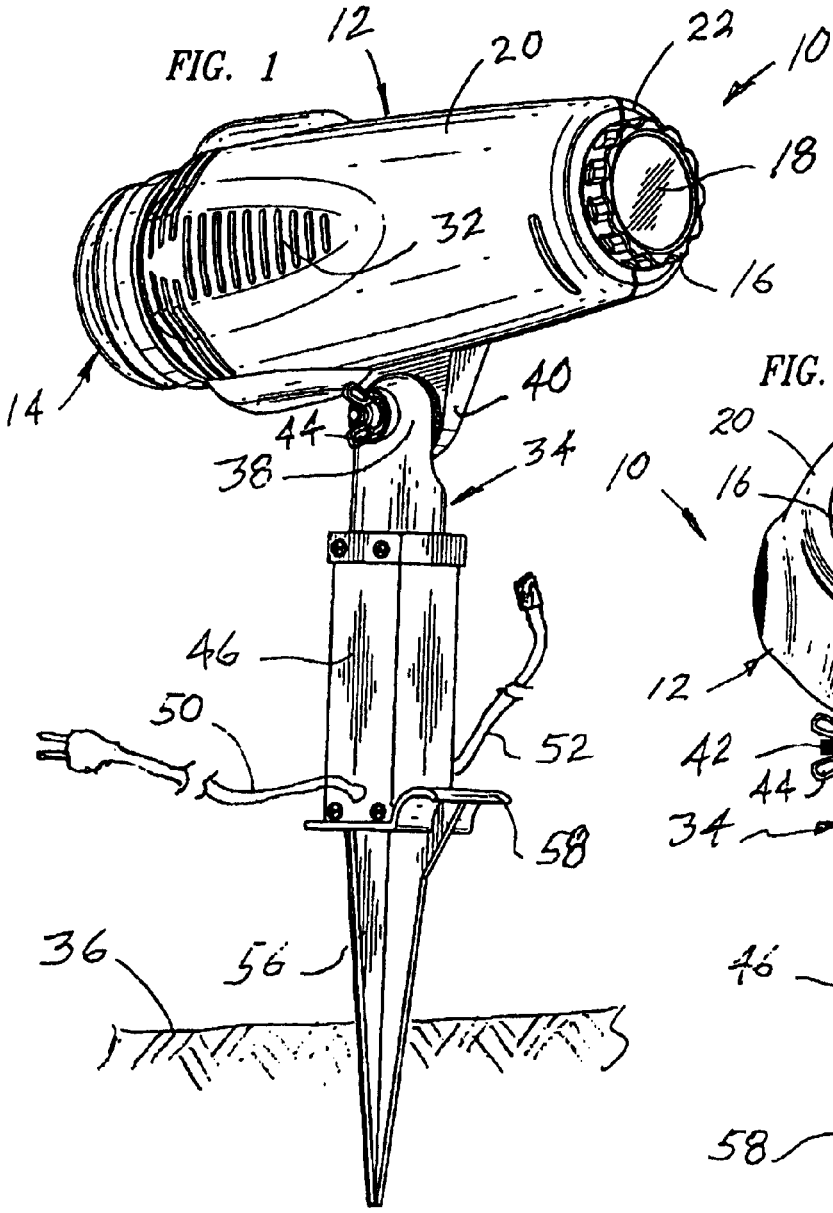
FIG. 1 is a front perspective view of a preferred projector of the invention.
Figure 2:
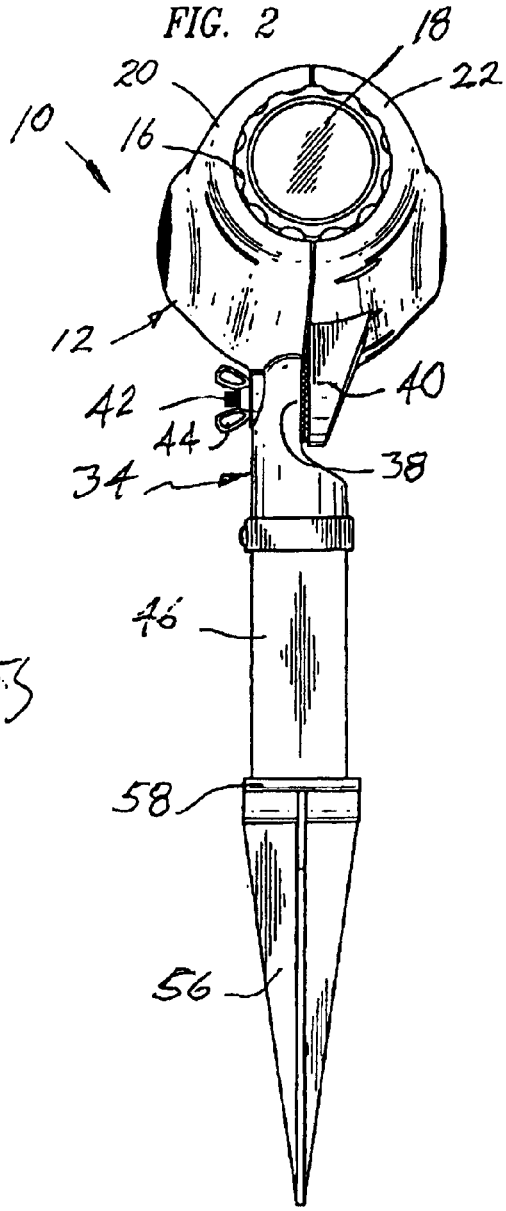
FIG. 2 is a right side elevational view of the projector of FIG. 1.
Figure 3:
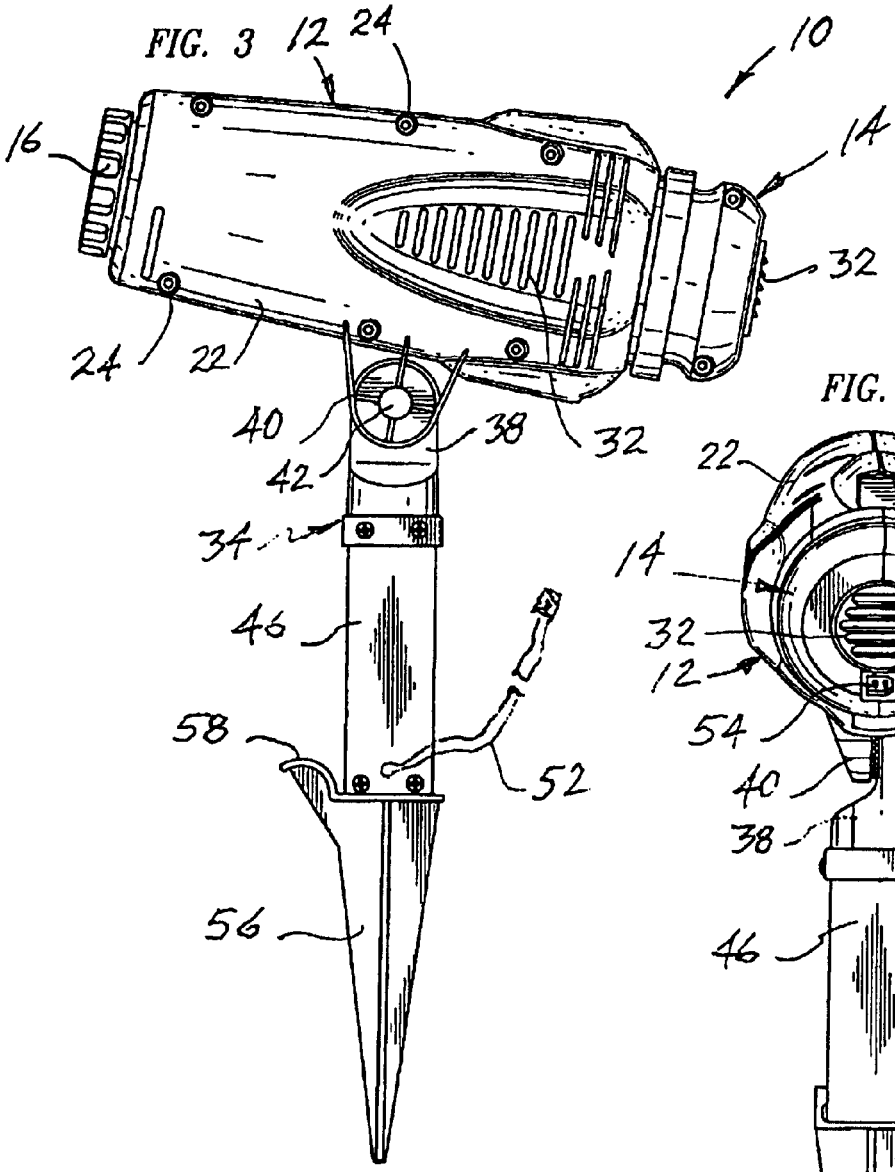
FIG. 3 is a rear elevation view of the projector of FIG. 1.
Figure 4:
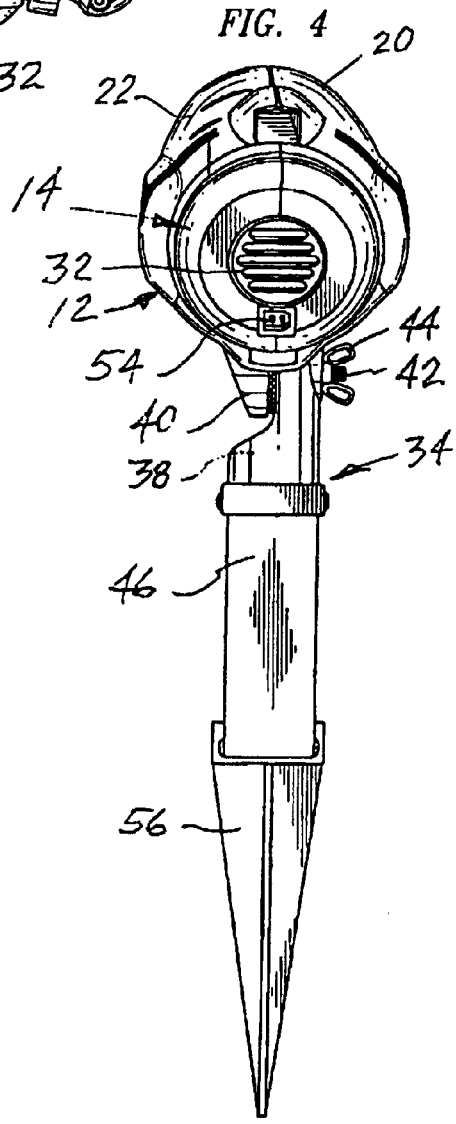
FIG. 4 is a left side elevation view of the projector of FIG. 1.
Figure 5:
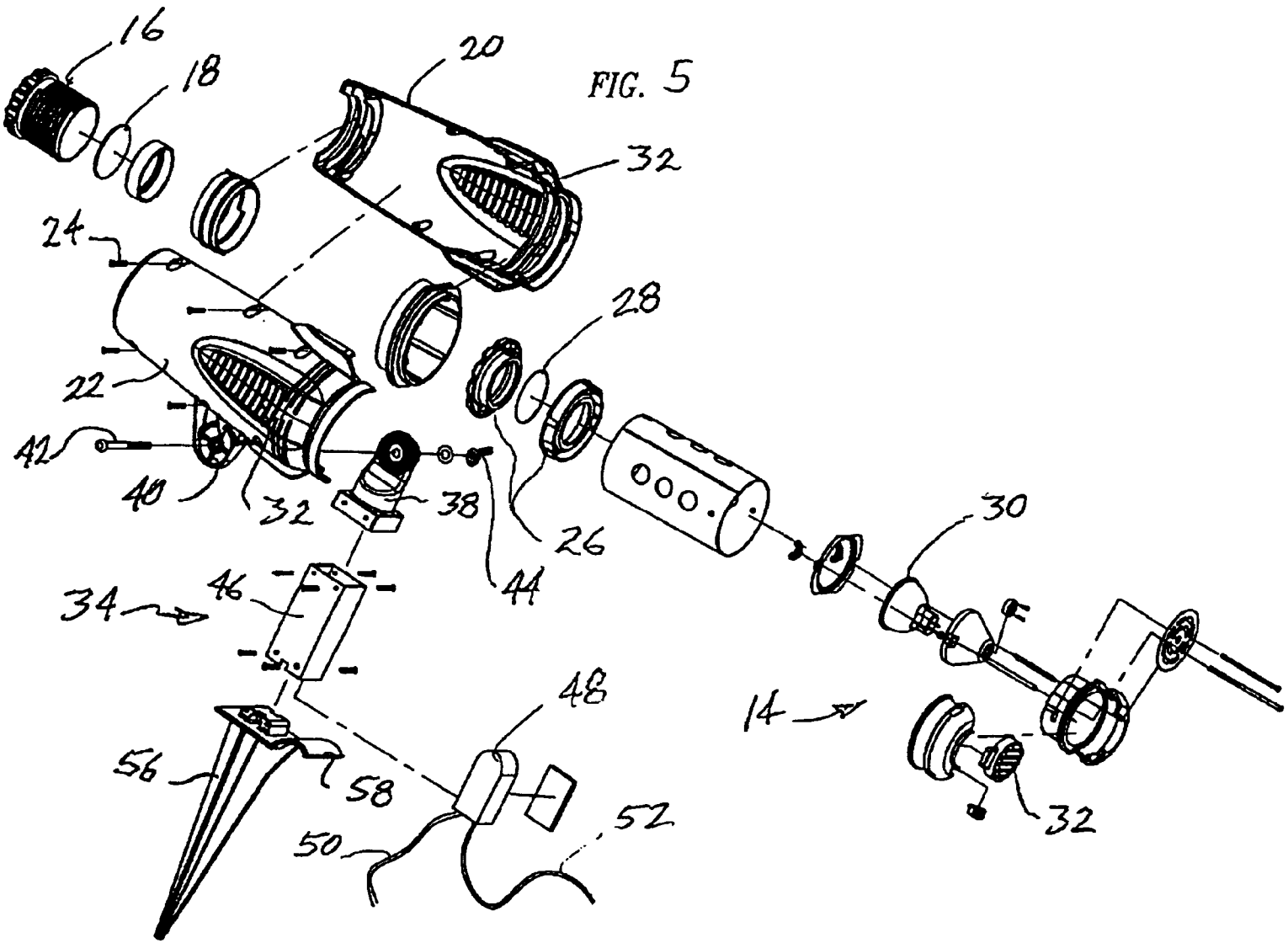
FIG. 5 is an exploded perspective view of the projector of FIG. 1.

Referring to FIGS. 1–5, projector 10 preferably comprises a polymeric housing 12 supporting a light source 14 at one end and a lens tube 16, most preferably containing a bioconvex lens 18, at the other. Housing 12 is preferably injection molded from an impact resistant polymer and is most preferably molded to two halves 20 and 22 that are joined during assembly with screws 24 or other similarly effective fasteners. The imaginary line between light source 14 and lens 18 establishes a light path that, when extended beyond projector 10, continues to a viewing surface upon which an image is to be projected. Housing 12 preferably further comprises an image medium support assembly 26 that is disposed between light source 14 and lens 18. Image medium support assembly 26 supports an image medium 28 such as, for example, a circular disk comprising a slide film or transparency in an image window through which light emanating from light source 14 is directed toward lens 18. Lens tube 16 is most preferably threaded into engagement with housing 12 in such manner that the focal length between image medium 28 and lens 18 can be adjusted within predetermined limits. Light source 14 preferably contains an electric lamp 30 and is threaded into engagement with the end of housing opposite lens tube 16. When removed, light source 14 also provides access to image medium support assembly 26 so that image medium 28 can be changed as desired. Vents or louvers 32 are desirably provided in housing 12 and in light source 14 to facilitate convective cooling of lamp 30 during use.

Projector 10 preferably further comprises a projector support member 34 to which housing 12 is connected in such manner that the angle of the light path relative to an underlying support surface can be adjusted easily by the user. According to one embodiment of the invention, the connecting mechanism comprises opposed engagement members 38, 40 having interlocking teeth and coaxially aligned apertures through which a threaded bolt 42 can be inserted and tightened using wing nut 44 when projector housing 12 is in the preferred angular position. Projector support member 34 preferably further comprises a tubular member 46 containing a transformer 48 that desirably converts standard household electrical current to a lower voltage for use with lamp 30 of projector 10. One electrical conductor 50 supplies electrical current to transformer 48 and another electrical conductor 52 supplies the converted current to plug 54 on the back of light source 14 of housing 12. Projector support member 34 preferably further comprises mounting stake 56 having footrest 58 to facilitate insertion of mounting stake 56 into the ground for outdoor use on earthen surface 36. Although projector support member 34 is described above in relation to a preferred embodiment intended for use with an earthen support surface 36, it will be apparent to those of ordinary skill in the art upon reading this disclosure that projector support members having other physical configurations can likewise be provided for use with other underlying support surfaces for projector 10.

Figure 6:
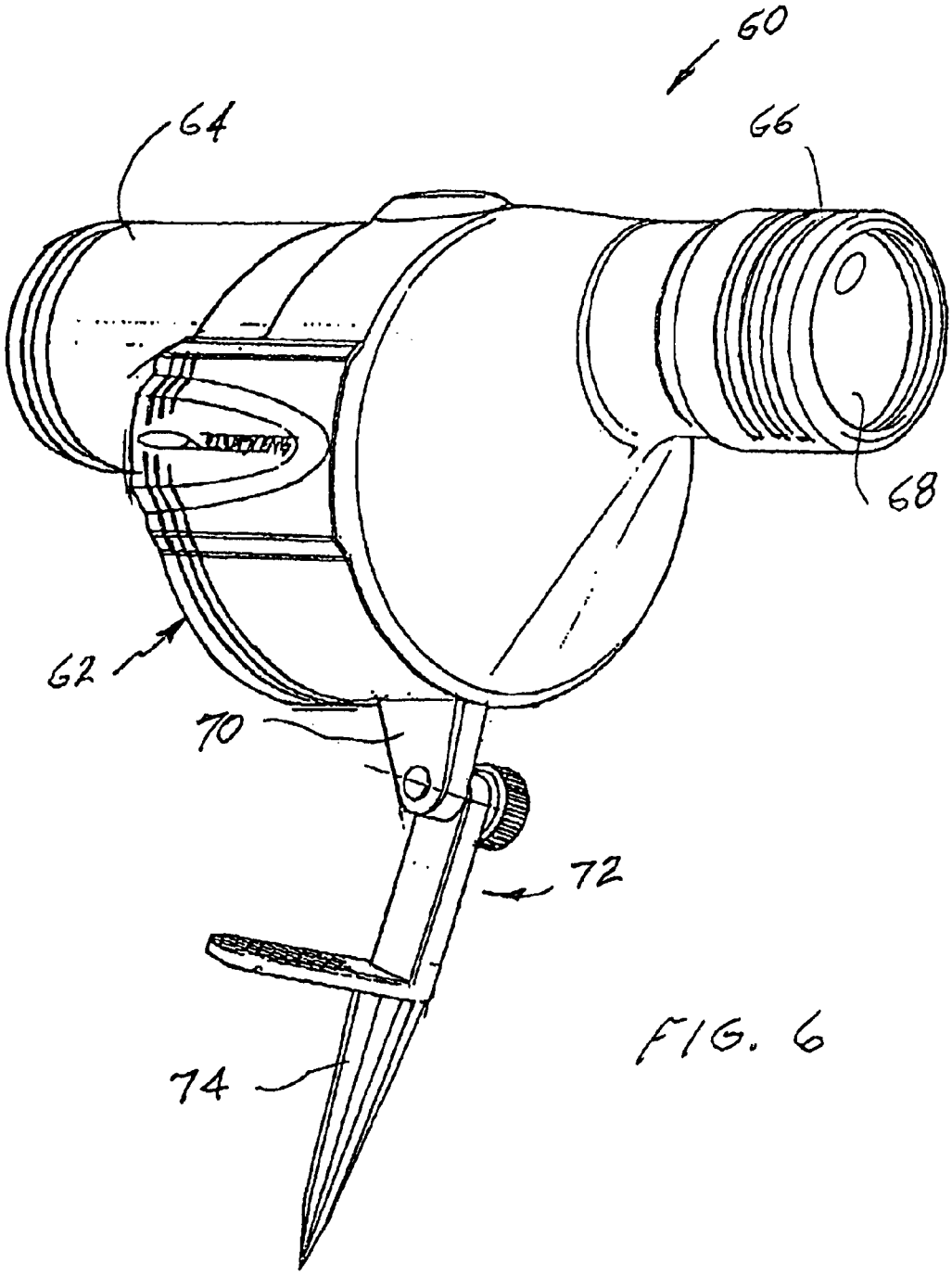
FIG. 6 is a front perspective view of another preferred projector of the invention that is modified to rotate an image wheel through the light path.
Figure 7:
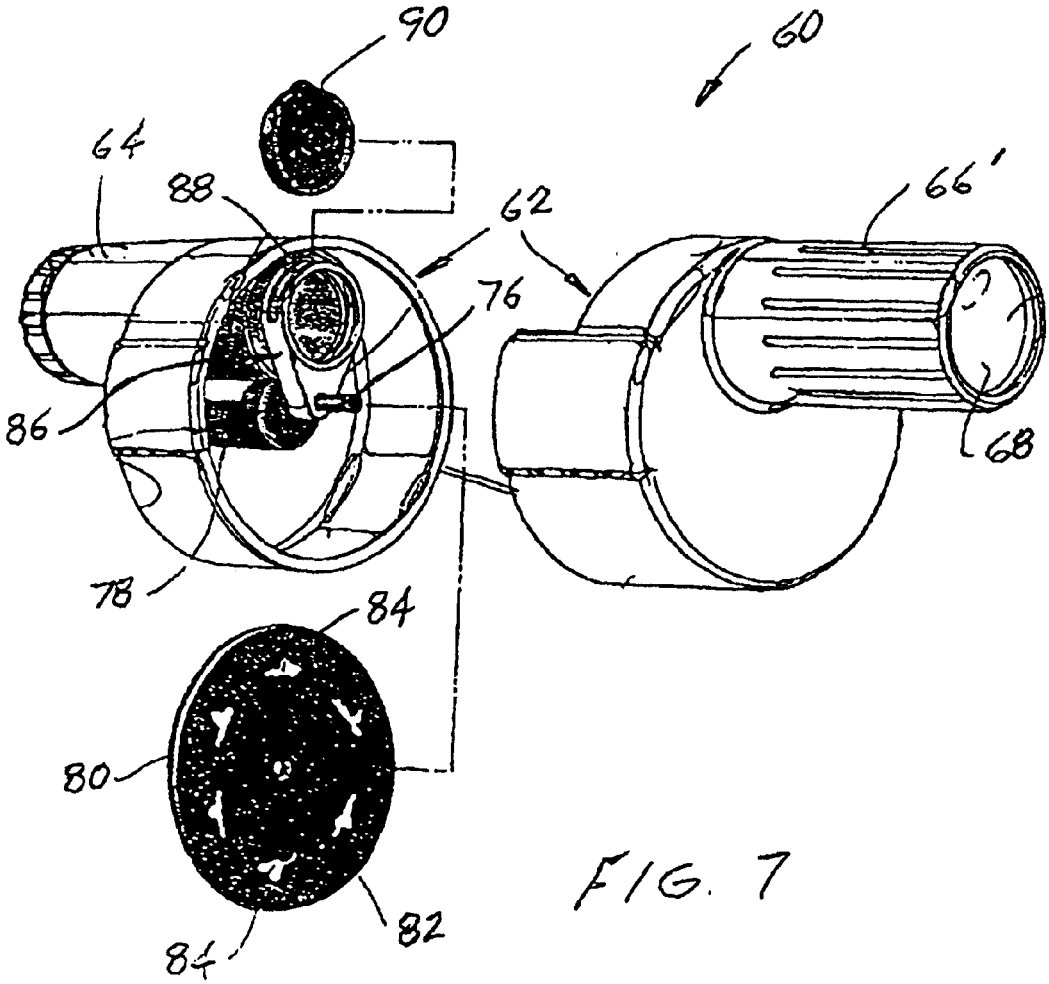
FIG. 7 is a partial exploded view of the projector of FIG. 6.

According to another embodiment of the invention, described herein in relation to FIGS. 6 and 7, a projector is disclosed that is substantially as described above but modified to serially advance different images into the light path without user intervention. A preferred modification for achieving this function this the provision of a small electric motor inside the housing with a rotating shaft that causes a wheel comprising multiple fixed images to rotate the same or different images sequentially through the light path of the projector. This rotation can be accomplished continuously or intermittently by the provision of appropriate conventional linkage and control mechanisms well known to those of skill in the art. Referring to FIG. 6, projector 60 preferably comprises an enlarged molded plastic housing 62, again having a light source 64 disposed at one end and a lens tube 66 containing lens 68 at the other, thereby defining a light path through the projector. Projector 60 is preferably attached by mounting stud 70 to support member 72, which is shown as having a stake 74 for insertion into an earthen surface for outdoor use. Electrical power cords and a transformer as previously described for projector 10 are also desirably utilized with this embodiment of the invention but are not depicted in the simplified drawing of FIG. 6.

The internal structure and operation of projector 60 are better described and explained in relation to FIG. 7, in which the parts are intended to be substantially identical to those depicted in FIG. 6, except that a differently shaped lens tube 66' is disclosed, and the mounting stud and support member are not shown to simplify the illustration. Also, because FIGS. 6 and 7 are simplified diagrammatic views, screws used to assemble the halves of body 62 and other structural details are shown in these figures. Referring to FIG. 7, housing 62 of projector 60 preferably comprises an electric motor 78 that rotates shaft 76, which is offset from the light path established by light source 64 and lens 68. Image medium support assembly 86 comprising image window 88 cooperates with rotatable shaft 76 to rotate image wheel 80. Image wheel 80 further comprises a centrally disposed aperture 82 that engages shaft 76 so that image wheel 80 is rotated through image window 88 whenever motor 78 is energized. Electrical cords, transformers and plugs are also not shown to simplify the illustration but can be provided as for projector 10 as previously described. Image wheel 80 preferably comprises a plurality of images 84 that are arcuately spaced apart near its periphery to facilitate the serial advancement of such images into image window 88 as wheel 80 rotates. Images 84 can be the same or different. Cartridge 90 is also desirably provided so that a single image or color filter can be installed inside image medium support assembly 86 in place of, or in addition to, using image wheel 80 if desired.

Figure 8:
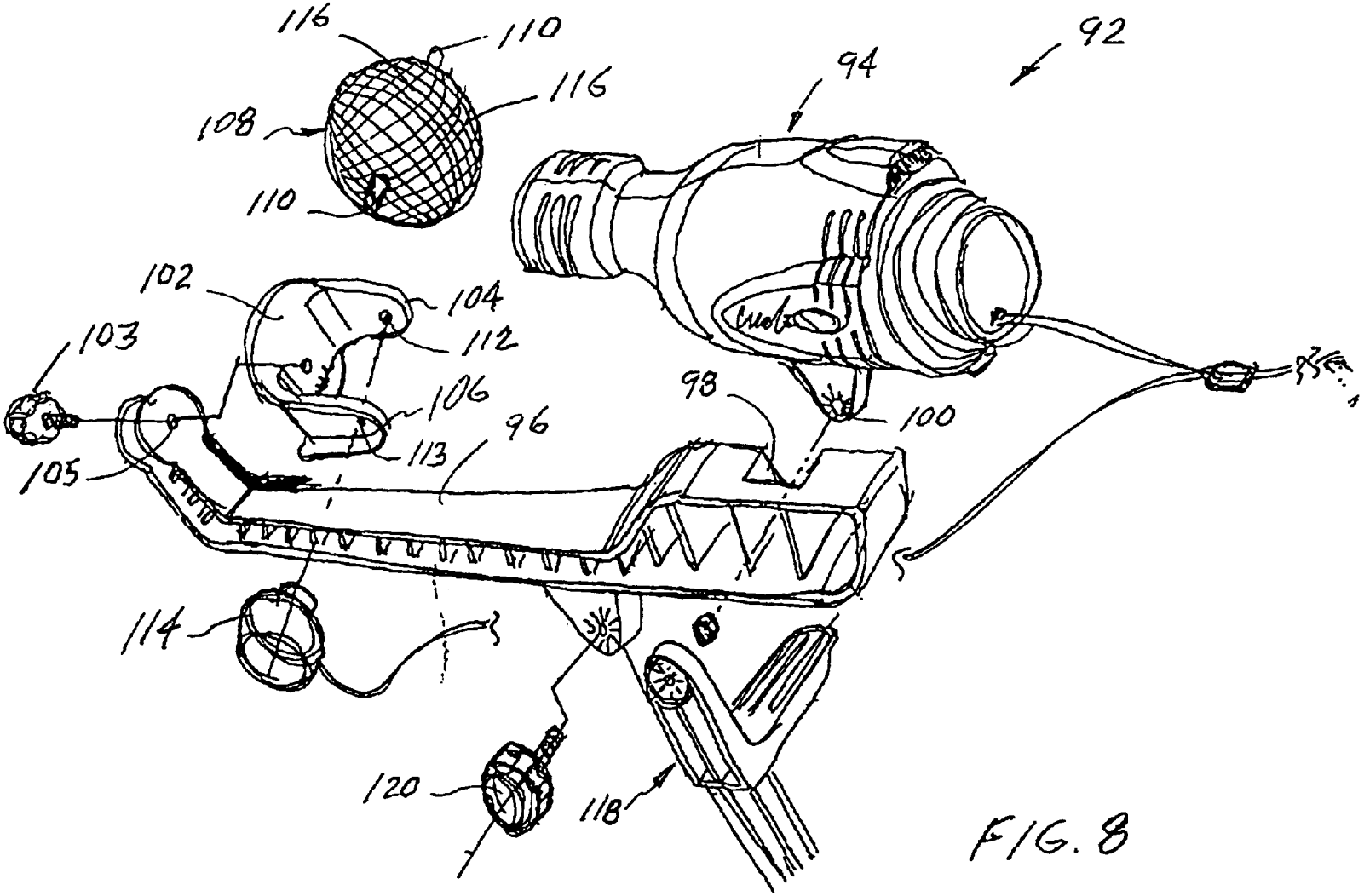
FIG. 8 is an exploded perspective view, partially broken away, of another preferred projector assembly of the invention wherein a mirror ball is rotatably mounted in the light path emanating from the projector.

According to another embodiment of the invention, a projector assembly is disclosed that comprises a low cost projector substantially as described above but modified to simultaneously project a single image in a plurality of directions after the projected light beam exits the projector housing. This embodiment of the invention utilizes a frame assembly that aligns the projector with a rotating mirror ball that simultaneously redirects the projected image in many different directions and continuously changes the image being projected onto a particular spot on surrounding viewing surfaces. This embodiment of the invention is particularly preferred for indoor use where the image can be directed against both walls and ceiling at the same time. Referring to FIG. 8, an exploded view is shown of a projector assembly 92 comprising projector 94, which can be mounted in fixed relation to support frame 96. Support frame 96 can in turn be adjustably mounted to support member 118 using bolt 120 to vary the inclination of frame 96 as desired. Frame member 96 preferably further comprises, in spaced apart relation to projector 94, a mounting bracket 102 secured to frame 96 by bolt 103 inserted through aperture 105, or by any other similarly effective means or mechanism. A multi-faceted reflective element such as mirror ball 108 is preferably supported on an axle 110 that is rotatably mounted in clevis members 104, 106 through apertures 112, 113 in such manner that axle 110 can be rotated by electric motor to slowly turn mirror ball 108. Mirror ball 108 preferably comprises a plurality of small mirrored surfaces 116 oriented in many different directions. The lighting effect achieved through the use of projector 94 in this manner under conditions of low ambient light is to simultaneously direct the projected image against many viewing surfaces, seemingly multiplying the projected image many times over. When mirror ball 108 is rotated, the effect is further enhanced by imparting motion to the multiple projected images.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A projector comprising a polymeric housing containing a directional electric light source, a lens disposed opposite the light source, a light path extending from the light source through the lens and out of the housing, an image medium support assembly disposed between the light source and the lens, the image medium support assembly further comprising an image window aligned in the light path, and an opening through which an image medium can be inserted into the image medium support assembly; and a support member attachable to the projector, the support member comprising a transformer and a first electrical conductor attachable to the projector and a second electrical conductor attachable to an electrical power source.

2. The projector of claim 1, wherein the support member comprises a tubular section and the transformer is disposed inside the tubular section.

3. The projector of claim 1 wherein the lens is biconvex.

4. The projector of claim 1 wherein the image medium is a light transmitting film.

5. The projector of claim 1 wherein the image medium is a light transmitting plastic disk.

6. A projector comprising a polymeric housing containing a directional electric light source, a lens disposed opposite the light source, a light path extending from the light source through the lens and out of the housing, an image medium support assembly disposed between the light source and the lens, the image medium support assembly further comprising an image window aligned in the light path, and an opening through which an image medium can be inserted into the image medium support assembly; and wherein the support member comprises a mounting stake.

7. A projector comprising a polymeric housing containing a directional electric light source, a lens disposed opposite the light source, a light path extending from the light source through the lens and out of the housing, an image medium support assembly disposed between the light source and the lens, the image medium support assembly further comprising an image window aligned in the light path, and an opening through which an image medium can be inserted into the image medium support assembly; and wherein the image medium support assembly further comprises an electric motor having a rotatable shaft and an image disk having arcuately spaced images, the disk being rotatable by a drive assembly connected to the rotatable shaft to serially advance the arcuately spaced images into the viewing window whereby two overlapping images may be projected from the projector simultaneously.

8. A projector comprising a polymeric housing containing a directional electric light source, a lens disposed opposite the light source, a light path extending from the light source through the lens and out of the housing, an image medium support assembly disposed between the light source and the lens, the image medium support assembly further comprising an image window aligned in the light path, and an opening through which an image medium can be inserted into the image medium support assembly; and a support member attachable to the projector wherein the support member comprises a mounting frame with a proximal end holding the projector and a distal end holding a multi-faceted reflector element in spaced apart relation to the projector, the reflector element being rotatably mounted on a shaft and disposed in the light path of the projector, the shaft being rotatable by an electric motor to rotate the reflector element in the light path of the projector.

9. The projector of claim 8 wherein the multi-faceted reflector element is a mirror ball.

10. A projector comprising a polymeric housing containing a directional electric light source, a lens disposed opposite the light source, a light path extending from the light source through the lens and out of the housing, an image medium support assembly disposed between the light source and the lens, the image medium support assembly further comprising an image window aligned in the light path, and an opening in which an image medium can be supported in the image medium support assembly; and a support member attachable to the projector, the support member comprising a transformer and a first electrical conductor attachable to the projector and a second electrical conductor attachable to an electrical power source.

11. A projector comprising a polymeric housing containing a directional electric light source, a lens disposed opposite the light source, a light path extending from the light source through the lens and out of the housing, an image medium support assembly disposed between the light source and the lens, the image medium support assembly further comprising an image window aligned in the light path, and an opening in which an image medium can be supported in the image medium support assembly; and a support member attachable to the projector comprising a mounting frame with a proximal end holding the projector and a distal end holding, in spaced apart relation to the projector, a multi-faceted reflector element, the reflector element being supported on two opposed sides and said reflector element being rotatable by an electric motor.

* * * * *